United States Patent [19]

Smith et al.

[11] Patent Number: 5,109,053

[45] Date of Patent: Apr. 28, 1992

[54] CURABLE AQUEOUS DISPERSIONS OF ACRYLATE-MODIFIED POLYAMIDE RESIN

[75] Inventors: George A. Smith, Newtown; Daniel T. Rumack, Holland, both of Pa.; Charles R. Frihart, Lawrenceville, N.J.

[73] Assignee: Union Camp Corporation, Wayne, N.J.

[21] Appl. No.: 541,561

[22] Filed: Jun. 21, 1990

[51] Int. Cl.$^5$ .............................................. C08L 77/00
[52] U.S. Cl. ................................... 524/514; 524/515; 524/523
[58] Field of Search ......................... 524/514, 515, 523

[56] References Cited

U.S. PATENT DOCUMENTS 4,644,036  2/1987  Walz et al. ..................... 525/330.7

FOREIGN PATENT DOCUMENTS 1135594  12/1968  United Kingdom .

Primary Examiner—Bernard Lipman
Assistant Examiner—Jeffrey T. Smith
Attorney, Agent, or Firm—William K. Wissing

[57] ABSTRACT

Aqueous dispersions of acrylate-modified polyamide resin having unreacted acrylate functionality are provided. These acrylate-modified polyamide dispersions cure upon exposure to either ultraviolet radiation or thermal energy to form cross-linked films useful, for example, as adhesive coatings. In a preferred embodiment, acrylate-modified dispersions are formed by the addition of a polyol ester having a multiplicity of acrylate ester groups to a polyamide resin having a multiplicity of free amino groups under conditions effective to form the Michael addition product thereof.

9 Claims, No Drawings

CURABLE AQUEOUS DISPERSIONS OF ACRYLATE-MODIFIED POLYAMIDE RESIN

BACKGROUND OF THE INVENTION

This invention relates to aqueous dispersions of polyamide resin, to modifying such resin dispersions by Michael addition with polyacrylates, and to curing acrylate-modified resin dispersions by exposure to radiation or thermal energy.

Polyamide resins are well known as a class of resins, as are numerous methods for their preparation. Polyamide resins are typically manufactured by reacting a di- or polyfunctional amine with a di- or polyfunctional acid. The properties of the polyamide resins will vary considerably depending upon the particular reactants employed in their synthesis. A known subclass of polyamides are aminoamide polymers having free (i.e., non-acylated) primary and secondary amino groups.

Polyamide resins are widely used in a variety of industrial applications. Polyamides are especially useful as adhesives and for forming water and solvent resistant coatings on substrates such as paper. An important related use of polyamide resins is as binders in printing inks and the like where film toughness, flexibility, and adhesion are important properties.

However, most polyamides are thermoplastic polymers which readily deform under heat and pressure and offer no practicable means by which they can be cured to form cross-linked, thermoset polymers. Cross-linked polyamides would be useful for many applications where properties such as solvent resistance are important. In addition, non-crosslinked, thermoplastic polyamides can be subject to cold flow, remelting, moisture degradation, and other modes of deterioration.

Unlike most polyamides, certain means are known for cross-linking aminoamides. However, such cross-linking generally requires a "two package" system, the aminoamide resin being one package, and a co-reactive resin—typically an epoxy resin—being the other package. Such "two package" systems are extensively used, but they require that two containers be employed and that considerable measuring and mixing be performed at the point of use. In addition, "two package" systems provide limited working time after mixing and generally require substantial time and/or heating to effect even partial cure.

One known approach to curing hot melt adhesives involves blending acrylate polymers into certain polyamides. However, the acrylate groups in these polymers have already been polymerized and are nonfunctional. Thus, the polyamides and acrylate polymers in such blends are not chemically linked by covalent bonds and cannot be cured or cross-linked to produce a thermoset material.

A number of classes of radiation curable acrylates are known to the art, such as the acrylates of polyurethanes described in U.S. Pat. No. 4,153,776 (Friedlander, et al.) and the acrylate derivatives of polycaprolactones as in U.S. Pat. No. 3,700,643 (Smith, et al.). However, these materials do not possess the adhesive character of the aminoamide resins. Moreover, they tend to be more costly than aminoamide resins made, for example, from tall oil.

It has been recognized that hot melt adhesives and other products based on polyamide resin present a number of problems relating to their application to various substrates. Common application methods involve heating the polyamide resins above their melting point and then applying the molten resins to the substrate. Such techniques, however, have certain inherent problems. For example, polyamide resins typically have high melting points, often higher than the thermal stability of the substrates onto which they are to be applied. Accordingly, the hot melt method can only be used in certain limited applications which require relatively expensive application equipment. Thus, the use of molten polyamide resins is not practical in many applications. Molten polyamide resins are also impractical where the resin is to be applied as a latent hot melt layer to be activated at a later time. For example, it may be desired to apply a polyamide resin to a textile interliner, incorporate the interliner into a garment, and then activate the adhesive to hold the assembled parts of the garment in position.

It has been recognized that certain of the application problems associated with the polyamide resins might be solved if the polyamides could be applied at ambient temperatures as a solution or a dispersion. For many applications, however, solutions of polyamide resins are unsatisfactory. Polyamide resins as a class have excellent resistance to solvents; even with respect to those solvents in which the polyamide resins are soluble, the solubility typically is relatively low. Furthermore, the solvents which have been used to make polyamide resin solutions often adversely react with the substrates to which the polyamide resin solutions are applied. A further problem associated with solvent solutions is that most solvents used are relatively expensive, often difficult or impossible to remove from the applied coatings, and present fire, toxicity, and environmental pollution problems.

To overcome or at least reduce the problems associated with such solvent solutions, it has been suggested to prepare emulsions or dispersions of the polyamide resins in water. Water is relatively inexpensive, evaporates fairly readily from applied coatings, is not flammable, and presents no environmental pollution problems.

SUMMARY OF THE INVENTION

The present invention provides aqueous dispersions of acrylate-modified polyamide resin having unreacted acrylate functionality. After application and solvent removal, these acrylate-modified polyamide dispersions cure upon exposure to either ultraviolet radiation or thermal energy to form cross-linked films useful, for example, as adhesive coatings. In a preferred embodiment, acrylate-modified dispersions are formed by the addition of a polyol ester having a multiplicity of acrylate ester groups to an polyamide resin having a multiplicity of free amino groups under conditions effective to form the Michael addition product thereof.

DETAILED DESCRIPTION OF THE INVENTION

The curable aqueous dispersions of this invention comprise the Michael addition product of a polyacrylate and an aqueous dispersion of polyamide resin having free amino groups. These acrylate-modified resin dispersions invention can be prepared from virtually any aqueous dispersion of polyamide resin having free amino groups. It is preferred that the aminoamide dispersion be produced from a polymerized unsaturated fatty acid, such as the commercially-known dimer acid, to have an amine number between about 1 and about 100, even more preferably between about 5 and about 20. With lower amine functionality, too little acrylate is present for good curing; with higher functionality, there is risk of premature gelation or at least excessive viscosity.

It will be appreciated that amine number represents the titratable base attributable to amine functionality present in a gram of resin and is expressed in terms of equivalent milligrams of potassium hydroxide. It will also be appreciated that the term "dimer acid" refers to polymeric fatty acids typically made from polymerization of unsaturated tall oil fatty acids. These polymeric fatty acids typically have 0–10% C-18 monobasic acids, 60–95% C-36 dibasic acids, and 1–35% C-54 tribasic and higher polymeric acids. The relative ratios of monomer, dimer, trimer and higher polymer in unfractionated dimer acid are dependent on the nature of the starting material and the conditions of polymerization and distillation.

Preferred aminoamide dispersions include those produced from dimer acid and a second dibasic acid having from 2 to about 20 carbon atoms. The second dibasic acid can be an aliphatic acid such as oxalic, azelaic, sebacic, dodecanedioic or eicosanedioic acid, or an aromatic acid such as isophthalic acid.

The amine component of aminoamides can be a diamine having from 2 to about 36 carbon atoms, such as ethylenediamine, hexamethylenediamine, diaminopropane, piperazine, 4,4'-dipiperidinyl, toluenediamine, methylenedianiline, xylenediamine, methylpentamethylene diamine, diaminocyclohexane, aminoethylpiperazine, polyetherdiamine, and diamines made from dimer acid. Preferred among these are ethylenediamine, hexamethylenediamine, piperazine, polyetherdiamine, and methylpentamethylenediamine. Higher polyamines, such as diethylenetriamine, triethylenetetramine, tetraethylenepentamine, and bishexamethylenetriamine can be included if small enough amounts are used to avoid premature gelation. Higher molecular weight polyetherdiamines can also be used.

Suitable aqueous dispersions of aminoamide resin are commercially available, such as Uni-Rez 2646, Uni-Rez 2622, Uni-Rez 2643, and Uni-Rez 2636, which are available from the Union Camp Corporation, Wayne, N.J. It is preferred that aqueous aminoamide resin dispersions be stable and of good quality. It will be appreciated that stability is manifested in aqueous resin dispersions which do not gel or separate into phases over time and that quality is manifested in dispersions which are homogeneous and have little grit.

A wide variety of polyacrylates are amenable to the practice of this invention. It will be appreciated that a polyacrylate is any moiety having more than one acrylate group within its chemical structure. Preferred polyacrylates are polyol esters having a multiplicity of acrylate ester groups. These preferred polyacrylates can be esters of acrylic or methacrylic acid or mixtures thereof having from two to about eight—preferably three—acrylic or methacrylic acid groups. It should be understood that "acrylate" is meant to include methacrylate, and "acrylic acid" to include methacrylic acid. The polyol may therefore have a minimum of two alcoholic hydroxyl groups before esterification. It is not necessary that all of the alcoholic groups be esterified with the acrylic acid, as long as at least two are so esterified on the average.

Thus, polyol esters of acrylic acid amenable to the practice of this invention include ethylene glycol diacrylate or dimethacrylate, butanediol diacrylate or dimethacrylate, diethylene glycol diacrylate or dimethacrylate, glycerol trimethacrylate, sorbitol triacrylate, trimethylolethane triacrylate, trimethylolpropane triacrylate, ethoxylated trimethylolpropane triacrylate, pentaerythritol tri- or tetraacrylate or tri- or tetramethacrylate, and multifunctional acrylates or methacrylates of dipentaerythritol or tripentaerythritol, sucrose pentamethacrylate, bisphenol-A bis(hydroxypropyl) ether diacrylate, and the like, with the materials trimethylolethane triacrylate, trimethylolpropane triacrylate, ethoxylated trimethylolpropane triacrylate, pentaerythritol tri- or tetraacrylate or tri- or tetramethacrylate being preferred. Trimethylolpropane triacrylate is most preferred.

It will be appreciated that initial 1,4-additions of nucleophilic species such as amino groups to $\alpha,\beta$-unsaturated carbonyl compounds such as polyol esters of acrylic acids are generally known in the art as Michael additions, and the adducts produced thereby as Michael addition products. Such reactions generally proceed spontaneously with moderate heating. The Michael addition is exothermic and one means for noting its completion is the cessation of heat evolution. Other physical means such as leveling out of the viscosity may be used to detect completion of the Michael addition reaction. The Michael addition can also be followed by many of the well known analytical methods for double bond assay, such as nuclear magnetic resonance (NMR) or infrared spectroscopy. For example, the ratio of olefinic protons to saturated aliphatic protons can be measured by NMR and will be seen to level out at a reduced ratio relative to the initial reaction mixture as the Michael addition comes to completion. The infrared absorption bands characteristic of the double bond will also be seen to level out as the Michael addition reaction comes to completion. It is even possible to note the substantial completion of the reaction by the disappearance of the characteristic odor of acrylate monomer and/or a separate gas phase.

The ratio of the aminoamide to the polyacrylate should be such that the initial ratio of the acrylate groups of the polyacrylate to the amino functional groups of the dispersed aminoamide resin is greater than one so that each amino group reacts with an acrylate group, leaving additional acrylate groups unreacted. It is preferred that this ratio be greater than about two; it is most preferred that it be greater than about 3. For example, if a diacrylate is used, the quantity of diacrylate must be about 1.0 mole per molar equivalent of amino functional groups in the aminoamide resin so that when the Michael addition is complete, the product will have some unreacted acrylate groups to cross-link in the curing step. For purposes of determining the proper appreciated that a primary amine functional group appended to an aminoamide resin counts as two free amino groups and a secondary amine functional group as one free amino group. This adjustment is made because a primary amine can participate in two Michael addition reactions, while a secondary amine can participate in only one. It is preferred that the polyacrylate have at least three acrylate groups so that the Michael addition product has at least two free acrylate groups. Those skilled in the art of resin manufacture will recognize that empirical adjustment slightly to one side or the other of the stoichiometric relationship may be useful to overcome such factors as hindered functional groups.

The aqueous aminoamide resin dispersions of this invention are cured by exposure to an effective amount of radiation or thermal energy, typically after removal of the water therefrom by evaporation. Such exposure promotes cross-linking of the resin through the free acrylate groups thereof. It will be appreciated that the term "radiation" encompasses visible or ultraviolet light, high voltage electron beam, gamma radiation, x-rays or other actinic radiation sufficient to produce a cure. Ultraviolet light is the preferred type of curing radiation.

The aqueous dispersions of this invention optionally includes a source of free radicals, also known as an initiator, to facilitate curing. An initiator must be stable under the storage conditions of the product. One category of initiators suitable for thermal curing of acrylate-modified resin dispersions are those with a half-life of 10 hours at above about 50° C., such as t-butyl peroxypivalate, lauroyl peroxide, benzoyl peroxide, t-butyl peroctoate, t-butyl peroxy isopropyl carbonate, t-butyl perbenzoate, di-t-butyl peroxide and t-butyl hydroperoxide, azobisisobutyronitrile, cumylhydroperoxide, dicumyl peroxide, t-butyl cumyl peroxide, bis(t-butylperoxy)diisopropylbenzene, and ethyl-O-benzoyllaurohydroximate.

Thermal initiators can be added before, during, or preferably after the Michael addition reaction. Addition after the reaction is preferred to avoid premature activation when the Michael reaction mixture is heated or exotherms during the reaction. Thermal initiator levels of from about 0.01 to about 5% by weight, more preferably about 0.02 to about 2%, are generally found to give an adequate balance between shelf life and cure rate at the desired cure temperatures. Dispersions containing initiators in the lower temperature range of activity should either be used quickly or stored with refrigeration. With initiators in the higher temperature range (i.e., those having a half life of 10 hours at above about 70° C.), the product will have a useful shelf life at ambient temperature.

The curing temperature for dispersion comprising heat activatable initiators will generally be between 70° and 250° C. The curing times will be on the order of minutes at upper portion of this temperature range and on the order of a week at the lower portion.

Photoinitiators may be included in the aqueous dispersions of this invention intended to be cured by ultraviolet light. The photoinitiator can be omitted for a product intended to be cured by other types of radiation, such as electron beam, gamma radiation, or x-ray. However, the presence of the photoinitiator allows the resin dispersion to be cured by any of these means. Suitable photoinitiators include benzoin ethers, dialkoxyacetophenone, alphahydroxycyclohexyl aryl ketones, alphaketophenylacetate esters, benzyldialkylketals, chloro- or alkylthioxanthones, alpha-amino- or alpha-hydroxyalkyl aryl ketones, and the like. A preferred photoinitiator is Irgacure 907, an alpha-aminoacetophenone made by Ciba-Geigy. Generally, amine synergists will not be necessary when a photoinitiator such as benzophenone or a thioxanthone—which are normally used with an amine synergist—is employed, as the resin itself provides amino groups. The photoinitiator can be mixed in at the time of the Michael addition reaction, either before, during or after the reaction.

It will appreciated by those skilled in the art of free radical polymer chemistry that the choice of a thermal or photo- initiator strongly influences the necessary cure conditions, such as temperature, exposure, and time.

It will likewise be appreciated by those skilled in the art of adhesive formulation that other additives such as fillers, reinforcing agents, coupling agents, colorants, odorants, other co-monomers, resins, tackifiers, plasticizers, lubricants, stabilizers, and the like can optionally be added. It is a further option to add additional amounts of a polyol acrylate to increase the cross-link density and give a more firmly cured product, or conversely to add a monoacrylate or a thermoplastic resin to get a softer more pliable product.

Additional objects, advantages, and novel features of this invention will become apparent to those skilled in the art upon examination of the following examples thereof, which are not intended to be limiting.

EXAMPLE 1

Unirez 2646 polyamide resin (Union Camp Corp) was dispersed in water using a combination of Jetamine DT (Jetco Chemicals) and Indulin Wi (Westvaco) as emulsifying agents. In this formulation, HCl was used to neutralize some of the amine groups at the ends of the polyamide chain which gave a dispersion with a pH of 6.5. This resulted in a stable, cationic dispersion. At this level of neutralization, we calculated that the system had a residual amine number of 2.

The dispersion was blended with an equivalent amount of trimethylopropane triacrylate (TmPTA) based on amine groups. The dispersion was heated slightly with stirring. After a few hours, the acrylate odor had disappeared indicating that the acrylate had reacted with the resin. After the odor had disappeared, 0.1% (based on resin solids) Irgacure 907 was blended into the dispersion. The resulting dispersion showed no signs of thickening or phase separation after sitting for 24 hours.

To test the properties of the modified resin dispersion, a sample was freeze dried to remoive the water. This left a white powder which was heated and made into 1.5 mm thick sheets. Dogbones were prepared from the sheets for tensile analysis. Half of the dogbones were then irradiated for 30 minutes under a UV lamp. Results were then compared to the undispersed base resin as well as the u nmodified dispersed resin. Results are as follows:

| Sample | Strength at Break (psi) | Elongation at Break (psi) |
| --- | --- | --- |
| UR 2646 | 457 | 136 |
| UR 2646[1] | 286 | 59 |
| UR 2646[1,2] | 397 | 103 |
| UR 2646[1,2,3] | 488 | 220 |

[1]Dispersed resin
[2]Acrylate modified
[3]UV cured

EXAMPLE 2

Unirez 2643 polyamide resin (Union Camp Corp) was acrylate modified by first melting the polyamide resin at 160° C. Once molten, TmPTA was added slowly to the molten resin with stirring. During this addition, a slight exotherm was observed and the viscosity of the resin increased dramatically.

After the acrylate addition, the modified resin was dispersed using a combination of NCY rosin (Union Camp Corporation) and Tergitol NP-40 (Union Carbide) as emulsifying agents. In this formulation, a small amount of KOH was used to form the potassium salt of the rosin. This resulted in a stable, anionic dispersion of the acrylate modified polyamide resin.

The properties of the acrylate modified dispersed resin were much improved over that of the starting base resin. The improvement was much greater than in Example 1 because a greater amount of amine functionality was present in the starting base resin (amine number of 6).

EXAMPLE 3

An experimental low softening point, low molecular weight polyamide was prepared by reacting Dimer 22 (Union Camp Corporation) with ethylenediamine (EDA) to give a polymer with an amine number of 40. This was dispersed in water using a combination of Tergitol NP-40 (Union Carbide) and acetic acid as emulsifying agents. The resulting material was a stable, cationic dispersion.

The dispersion was blended with 1 equivalent of TmPTA and allowed to stand at room temperature for 8 hours. After this time, only a slight acrylate odor was detectable. At this point, 0.1% Irgacure 907 was added to give a stable dispersion which showed no signs of thickening or phase separation even after 6 months on the shelf. Tensile properties of the results material are as follows:

| Sample | Strength at Break (psi) | Elongation at Break (%) |
|---|---|---|
| Resin | 100 | 24 |
| Dispersion[1] | 935 | 325 |
| Dispersion[1,2] | 977 | 281 |

[1] Acrylate modified
[2] UV cured for 30 minutes

What is claimed is:

1. A curable aqueous dispersion of acrylate-modified polyamide resin prepared by contacting an aqueous dispersion of polyamide resin having a multiplicity of free amino groups with a polyacrylate having a multiplicity of non-polymerized acrylate groups under conditions which effect Michael addition of the polyamide resin and the polyacrylate through said free amino groups and said non-polymerized acrylate groups, the initial ratio of non-polymerized acrylate groups to free amino groups being greater than 1.

2. An aqueous dispersion of acrylate-modified polyamide resin curable upon exposure to thermal energy, prepared by contacting an aqueous dispersion of polyamide resin having a multiplicity of free amino groups with a polyacrylate having a multiplicity of non-polymerized acrylate groups under conditions which effect Michael addition of the polyamide resin and the polyacrylate through said free amino groups and said non-polymerized acrylate groups, the initial ratio of non-polymerized acrylate groups to free amino groups being greater than 1.

3. The aqueous dispersion of acrylate-modified polyamide resin of claim 2 further comprising an effective amount of an initiator for thermal curing.

4. An aqueous dispersion of acrylate-modified polyamide resin curable upon exposure to ultraviolet radiation, prepared by contacting an aqueous dispersion of polyamide resin having a multiplicity of free amino groups with a polyacrylate having a multiplicity of non-polymerized acrylate groups under conditions which effect Michael addition of the polyamide resin and the polyacrylate through said free amino groups and said non-polymerized acrylate groups, the initial ratio of non-polymerized acrylate groups to free amino groups being greater than 1.

5. The aqueous dispersion of acrylate-modified polyamide resin of claim 4 further comprising an effective amount of an initiator for ultraviolet curing.

6. An adhesive coating prepared from the aqueous acrylate-modified dispersion of claim 1.

7. An adhesive coating prepared from the aqueous acrylate-modified dispersion of claim 2.

8. An adhesive coating prepared from the aqueous acrylate-modified dispersion of claim 4.

9. A Michael addition product of an aqueous dispersion of polyamide resin having a multiplicity of free amino groups and a polyacrylate having a multiplicity of non-polymerized acrylate groups, wherein the polyamide resin and the polyacrylate are reacted through said free amino groups and said acrylate groups.

* * * * *